US005776619A

United States Patent [19]

Shanton

[11] Patent Number: 5,776,619

[45] Date of Patent: Jul. 7, 1998

[54] PLATE STOCK

[75] Inventor: Kenneth J. Shanton, Neenan, Wis.

[73] Assignee: Fort James Corporation, Richmond, Va.

[21] Appl. No.: 688,871

[22] Filed: Jul. 31, 1996

[51] Int. Cl.$^6$ .......................... B32B 23/08; B32B 23/06; B32B 27/10; B05D 1/36

[52] U.S. Cl. .......................... 428/511; 427/411; 427/391; 427/361; 427/326; 428/514; 428/517; 493/320; 493/326; 493/328; 493/330

[58] Field of Search .................................... 427/391, 411, 427/407.1, 326, 361, 362, 416; 428/537.5, 511, 514, 517, 518, 520; 493/320, 326, 328, 330, 901, 902, 907

[56] References Cited

U.S. PATENT DOCUMENTS

| | | | |
|---|---|---|---|
| 4,048,380 | 9/1977 | Blakey et al. | 427/362 |
| 4,154,899 | 5/1979 | Hershey et al. | 428/537 |
| 4,289,808 | 9/1981 | Huang | 427/391 |
| 4,421,825 | 12/1983 | Seiter | 427/411 |
| 4,431,769 | 2/1984 | Yoshida et al. | 524/555 |
| 4,567,099 | 1/1986 | Van Gilder et al. | 428/327 |
| 4,568,574 | 2/1986 | Allen | 427/391 |
| 4,606,496 | 8/1986 | Marx et al. | 229/2.5 R |
| 4,609,140 | 9/1986 | Van Handel et al. | 229/2.5 R |
| 4,613,650 | 9/1986 | Sekiya et al. | 524/828 |
| 4,657,821 | 4/1987 | Ura et al. | 427/391 |
| 4,721,499 | 1/1988 | Marx et al. | 493/152 |
| 4,721,500 | 1/1988 | Van Handel et al. | 493/152 |
| 4,806,167 | 2/1989 | Raythatha | 106/465 |
| 4,820,554 | 4/1989 | Jones et al. | 427/391 |
| 5,078,939 | 1/1992 | Katsura et al. | 264/137 |
| 5,100,472 | 3/1992 | Fugitt et al. | 106/486 |
| 5,153,061 | 10/1992 | Cavagna et al. | 427/391 |
| 5,169,715 | 12/1992 | Maubert et al. | 428/331 |
| 5,298,335 | 3/1994 | Reed et al. | 427/391 |
| 5,334,449 | 8/1994 | Bergmann et al. | 428/327 |
| 5,358,790 | 10/1994 | Rüf et al. | 427/391 |
| 5,362,573 | 11/1994 | Pandian et al. | 427/391 |
| 5,494,716 | 2/1996 | Seung et al. | 428/34.2 |
| 5,498,452 | 3/1996 | Powers | 428/34.2 |
| 5,603,996 | 2/1997 | Overcash et al. | 427/333 |
| 5,635,279 | 6/1997 | Ma et al. | 427/411 |

OTHER PUBLICATIONS

BASF Product Chart Acrylic Dispersions (undated).

Technical Information, Acronal S 504, BASF Corporation, 1991 (No Month).

*Primary Examiner*—Diana Dudash
*Attorney, Agent, or Firm*—Sixbey, Friedman, Leedom & Ferguson, P.C.; Charles M. Leedom, Jr.; Donald R. Studebaker

[57] ABSTRACT

An improved coated paperboard or plate stock useful for forming substantially rigid food containers such as plates, bowls, trays and the like and a process from producing the improved coated paperboard are provided. A base coat comprising a styrene acrylic latex and a pigment is applied directly to the paperboard, and a top coat comprising a styrene acrylic polymer latex and a pigment is applied directly to the base coat to form the coated plate stock. The improved coated plate stock is characterized by improved grease, oil and cut resistance, improved varnish gloss, enhanced smoothness, and improved printing quality.

29 Claims, 1 Drawing Sheet

PLATE STOCK

TECHNICAL FIELD

The present invention relates generally to an improved coated paperboard and specifically to an improved coating for a paperboard or plate stock intended for use in forming food containers and a method for producing an improved coated plate stock and an improved food container.

BACKGROUND OF THE INVENTION

Coated paperboards of the kind typically used for forming disposable plates, bowls, trays and similar food containers have not performed as satisfactorily as desired. The safety of the components of coatings applied to paperboard intended to contact food must be approved by the U.S. Food and Drug Administration (FDA). Currently available coatings made from FDA approved components have not been as resistant to grease or oil or as smooth as desired. In addition, the cut resistance of these coatings has not been optimum. As a result, greasy or oily foods, such as fried chicken and salad dressing, have been able to permeate the coating and soak the underlying paperboard. In addition, the relative ease with which the available coatings can be cut permits liquids to pass through to the paperboard. Paperboard that has been soaked with grease or other liquids quickly loses its strength. Most people have experienced a “paper” plate that failed to hold its shape and, ultimately, the food on it at a picnic or other function. Moreover, because the surface formed by the available approved food contact coatings is characterized by high roughness, the quality of printing by gravure and other methods used to decorate paperboard dishes has been less than desired.

Disposable plates, bowls, trays and similar food service containers made from coated paperboard are typically relatively rigid structures that are formed by pressing coated paperboard blanks between forming dies into the shapes desired. U.S. Pat. Nos. 4,606,496 to Marx et al.; 4,609,140 to Van Handel et al.; 4,721,499 to Marx et al.; and 4,721,500 to Van Handel et al., all of which are owned by the assignee of the present invention, exemplify prior art methods of forming rigid paperboard containers. For optimum grease and cut resistance in the finished product, the coating on the paperboard must be able to withstand the temperatures and pressures of forming processes such as those described in the aforementioned patents.

The prior art is replete with examples of paper and paperboard coated with various compositions to impart selected characteristics, such as high gloss, ink receptivity, porosity and brightness to the finished product made from the coated paper or board. Generally, such coating compositions contain a pigment, a binder or adhesive, and a polymer latex. The process for coating paper disclosed in U.S. Pat. No. 4,154,899 to Hershey et al. describes a coating composition including a clay, at least 80% by weight of which has particles less than 2 microns, a water soluble or dispersible adhesive or binder, preferably starch, and a polymer latex of styrene/butadiene or acrylic polymers. Improvements in porosity, levelness, smoothness, and ease of finishing are produced in the graphic arts printing papers produced by this coating process. This patent does not suggest a coating composition or process suitable for producing a coated paperboard with improved grease, oil and cut resistance or increased varnish gloss suitable for forming food containers. U.S. Pat. No. 4,806,167 to Raythatha discloses coating paper or board useful for printing with a coating composition containing an aggregated kaolinitic pigment and a calcium carbonate aggregation enhancing agent to improve light scattering characteristics. It is not suggested, however, that this coating composition could be useful, either alone or in combination with a polymer latex, to improve the grease, oil or cut resistance or printing quality of paperboard to be formed into rigid food containers.

U.S. Pat. Nos. 5,100,472 to Fugitt et al. and 5,169,715 to Maubert et al. both disclose the production of high gloss papers by the application of coating compositions including pigments, such as kaolin and calcium carbonate, and latex polymers, such as styrene/butadiene and styrene/isoprene copolymers. The application of these compositions to paperboard or plate stock to improve plate properties is not suggested. U.S. Pat. No. 4,820,554 to Jones et al. describes improving the optical and printing properties of paperboard with a coating containing a structured kaolinitic pigment. However, the coating described in this patent is not disclosed to impart optimum grease, oil or cut resistance to paperboard intended to be formed into rigid food containers.

U.S. Pat. No. 4,431,769 to Yoshida et al. discloses a binder composition for coating paper to produce heat or light sensitive papers or magnetic recording papers. This binder composition, which includes one or more water soluble copolymers of acryl- or methacrylamide and acrylic or methacrylic acid derivatives, such as alkyl or hydroxyalkyl esters, N-methylolamides and nitrites, is not disclosed to be suitable for application to paperboard intended to contact food.

U.S. Pat. Nos. 4,567,099 to Van Gilder et al. and 4,613,650 to Sekiya et al. disclose coating compositions including copolymer latexes and pigments which impart characteristics such as high sheet gloss, high porosity, good binding strength, and high ink receptivity to printing papers. Van Gilder et al. discloses the use of a styrene/butadiene/acrylic acid/itaconic acid polymer, and Sekiya et al. discloses a copolymer latex including a conjugated diolefin, an aromatic vinyl compound, vinyl cyanide, and an alkyl ester of an unsaturated carboxylic acid in the paper coatings described therein. It is not suggested that these compositions could be applied to paperboard intended to be formed into food containers.

Coated paperboards currently used as plate stock for food containers and cartons generally employ a coating formed of at least three different latexes and a kaolin clay. While these coated paperboards have been acceptable, they have not performed as well as desired. Coatings based on styrene butadiene latex have good barrier properties when tested with standard oil and dye stain tests. However, these properties, in particular the cut resistance and the resistance to grease penetration, are significantly reduced when styrene-butadiene latex coated paperboard is subjected to the heat and pressure associated with plate making dies.

The prior art, therefore, has failed to disclose either an improved coated paperboard or plate stock coated with a composition approved for contact with food capable of enhancing grease, oil and cut resistance, of improving printing quality and varnish gloss, and of withstanding container production processes without compromising these properties of the finished food container or a method for producing an improved food container from coated paperboard or plate stock.

SUMMARY OF THE INVENTION

It is a primary object of the present invention, therefore, to overcome the disadvantages of the prior art and to provide an improved coated paperboard or plate stock and a method of producing an improved coated paperboard suitable for forming food containers.

It is another object of the present invention to provide a coated paperboard with enhanced smoothness and improved printing quality.

It is a further object of the present invention to provide a coated paperboard with improved varnish gloss.

It is still another object of the present invention to provide a coated plate stock with improved resistance to grease and oil soak through.

It is a still further object of the present invention to provide a coated plate stock with improved cut resistance.

It is yet another object of the present invention to provide a method for producing a coated paperboard suitable for forming food containers with improved grease, oil and cut resistance, printing quality and varnish gloss.

It is yet a further object of the present invention to provide a method for producing an improved food container from a coated paperboard characterized by improved grease, oil and cut resistance, printing quality and varnish gloss.

The aforesaid objects are accomplished by providing a paperboard suitable for use in forming rigid food containers coated with one or more layers of a coating that is safe for contact with food, wherein a plate stock or paperboard substrate is coated with a layered coating comprising a base coat comprising a styrene acrylic polymer latex and a pigment applied directly to the substrate and a top coat comprising a styrene acrylic polymer latex and a pigment applied to the base coat. The present invention further provides a process for producing a coated paperboard including the steps of sizing a selected paperboard suitable for use as a plate stock, applying a base coat comprising a styrene acrylic polymer latex and a pigment directly to the sized paperboard, and drying the applied base coat. A top coat comprising a styrene acrylic polymer latex and a pigment is then applied directly to the base coat. The coated paperboard is optionally gloss calendered to produce a grease, oil and cut resistant coated plate stock with improved varnish gloss and printing quality capable of maintaining these improved properties after being formed into substantially rigid plates, bowls, trays and similar food containers. The coated paperboard thus formed is also suitable for use as food packaging materials.

Additional objects and advantages will be apparent from the following description, claims and drawings.

DESCRIPTION OF THE PREFERRED EMBODIMENTS

The coating and method for producing coated paperboard of the present invention provides food containers with improved functional properties, in particular grease, oil and cut resistance and enhanced printing qualities, which results in a food service product that is more attractive to consumers. Not only can the plates, bowls, trays, and cartons formed in accordance with the present coating process be printed and decorated more easily, but these food service products perform more effectively than those made from available coated paperboard.

Figure 1:
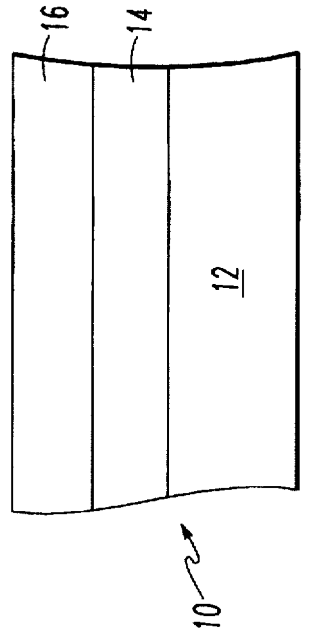
FIG. 1 is a diagram of the improved layered coated plate stock of the present invention.

FIG. 1 is a diagram of a coated paperboard or plate stock 10 according to the present invention. A paperboard substrate 12 provides the base for two coating layers, a base coat 14, which is coated directly on the substrate 12, and a top coat 16, which is coated directly on the base coat 14. One or more selected finish coatings (not shown) of the kind used in producing food containers can optionally be applied to the exposed surface of the top coat 16, if desired. Each of the base coat and the top coat is applied at a coatweight in the range of from about 4 pounds per 3000 square feet to about 12 pounds per 3000 square feet. The preferred coatweight application for the base coat is 8 pounds per A3000 square feet, and the preferred coatweight application for the top coat is 6 pounds per 3000 square feet.

The paperboard substrate can be formed from any kind of natural or synthetic paperboard with a weight suitable for the desired end use application. A food tray, for example, may be formed from a heavier weight board than a bowl or a carton blank. Paperboard with a weight in the range of about 90 pounds per 3000 square feet to about 300 pounds per 3000 square feet is preferred for use in the present invention.

The compositions of the base coat and the top coat were carefully selected to produce the desired optimum plate, printing and gloss characteristics in the finished food service products. Because the products made according to the present invention are intended to be in contact with food for varying periods of time, only components approved by the U.S. Food and Drug Administration could be considered for the present coating composition. The base coat and the top coat may include substantially the same components or may have different components. One coating formulation found to be especially effective in producing the desired optimum product properties includes a base coat comprising a styrene-acrylic polymer latex and a pigment comprising a mixture of a selected kaolin clay and calcium carbonate and a top coat comprising a styrene-acrylic polymer latex and a mixture of a selected kaolin clay and calcium carbonate. Minor amounts of other additives typically used in paperboard coatings, such as dispersants, thickeners and water retention aids, coating lubricants, biocides for bacterial control, crosslinking agents to crosslink the latex, alkali, such as ammonia or sodium hydroxide to adjust the pH of the color, and selected dyes, may also be included in either the base coat, the top coat, or both. A preferred base coat pigment mixture of 80 parts kaolin clay and 20 parts calcium carbonate, and a top coat pigment mixture of 90 parts kaolin clay and 10 parts calcium carbonate forms a very effective coating when combined with a styrene-acrylic polymer latex.

Several different polymer formulations were investigated for forming the latex portion of the coating composition of the present invention. A polyvinyl acetate/acrylate polymer latex in the top coat and a styrene butadiene latex in the base coat currently used in a packaging grade application were tested, but were found to produce a plate coating with poor plate properties, especially grease resistance. Two different ethylene vinyl acetate polymers, one in combination with polyvinyl alcohol and one in combination with ethylene vinyl chloride, were also evaluated. These latexes produced reasonable plate properties, but were inferior to a styrene acrylic based latex. The latex polymer that produced the best functional properties in the finished products was a styrene acrylic based latex. As long as a styrene acrylic polymer latex is used to form the top coat, other polymer latexes can be used to form the base coat, and benefits of the present invention will be obtained.

The preferred latex for the present invention is an anionic dispersion of an n-alkyl-acrylate-acrylonitrile-styrene copolymer, where the alkyl may be ethyl, propyl, butyl, amyl, hexyl or octyl, and iso-alkyl-acrylate-styrene-acrylonitrile-polymers, where the alkyl may be propyl, butyl, amyl, hexyl or octyl, approved by the FDA for food contact, which produces superior plate properties compared to previously used coating compositions. Other available styrene-acrylic latexes have been evaluated and are also suitable for use in the present coating composition. However, although these latexes work well, most do not produce the superior results seen with the preferred n-butyl-acrylate-acrylonitrile-styrene copolymer. This copolymer is a strong binder with good film forming and varnish hold-out properties. Styrene acrylic latexes preferred for use in forming the coating compositions of the present invention are commercially available from BASF Corporation, Charlotte, N.C., under the designations ACRONAL® S 504 and ACRONAL® S 728. ACRONAL® S 504 is particularly preferred. Other styrene acrylic latexes suitable for use in the present coating compositions are also available from Dow Chemical Company. A styrene copolymer latex selected for the present coating composition should preferably have a glass transition temperature (Tg) of about −6° Centigrade to about +31° Centigrade.

Styrene acrylic latexes can be used alone or in combination with other polymers to form the coating composition of the present invention. Other polymers that could be combined with a styrene acrylic polymer to form the latex portion of the base or top coat include, for example, ethylene vinyl acetates, ethylene vinyl chloride copolymers, polyvinyl acetates, polyvinyl acetate-acrylate copolymers, polyvinyl alcohol, starch-latex grafts, styrene maleic anhydride polymers, and styrene butadiene polymers. The foregoing are intended to be merely exemplary of some of the polymers that could be combined with the preferred styrene acrylic polymer latex.

The significant improvements in plate and other properties achieved by the present invention result primarily from combining the preferred styrene acrylic polymer latex with a particulate pigment mixture of a selected kaolin clay and calcium carbonate. The base coat preferably uses a blend of about 80 parts of #2 kaolin clay and about 20 parts calcium carbonate, and the top coat preferably uses a blend of about 90 parts of #1 kaolin clay and about 10 parts calcium carbonate. The improved particle packing of these blends, which contributes to better smoothness and ink and varnish holdout properties in the finished products, may be attributed to the presence of particles of different mean particle sizes. Kaolin clays preferred for the foregoing blends are those characterized as "premium" grades and have a %GE brightness in excess of 85%. These kaolins also have about 80% of the particles less than 2 microns in size. Calcium carbonate suitable for use in the present invention is available under the designation CARBITAL® from ECC International of Atlanta, Ga. Several of the CARBITAL® products, particularly CARBITAL® 35, CARBITAL® 60 and CARBITAL® 95, are preferred for the pigment portion of the present coating. CARBITAL® 95, for example, is an ultrafine, wet ground calcium carbonate which enhances brightness and gloss. A blend of kaolin and calcium carbonate available from ECC International under the designation KAOCARB 5 has also been used effectively in the present coating. Significant improvements in Parker Print smoothness and Sheffield roughness were observed in coated paperboards which included KAOCARB 5 with the polymer latex described above.

Although the foregoing pigments are preferred as components of the improved plate stock of the present invention, other pigments which could be used include, for example, calcined clay, chemically structured clay, ground calcium carbonate, precipitated calcium carbonate, talc, titanium dioxide, silica, alumina, barytes, calcium sulfate, aluminosilicates, plastic pigments, hollow sphere plastic pigments, and hollow glass pigments. These pigments, which are merely illustrative of the possible pigments that could be used in the present invention, can be used alone or in combination with other pigments.

Figure 2:
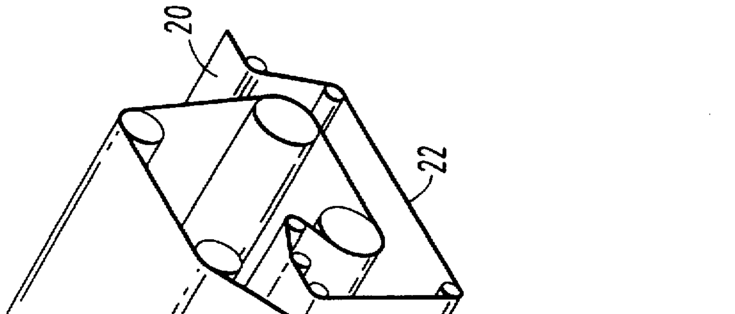
FIG. 2 is a diagrammatic representation of a paperboard coating process useful for producing the coated paperboard or plate stock of the present invention to paperboard.
Figure 2:
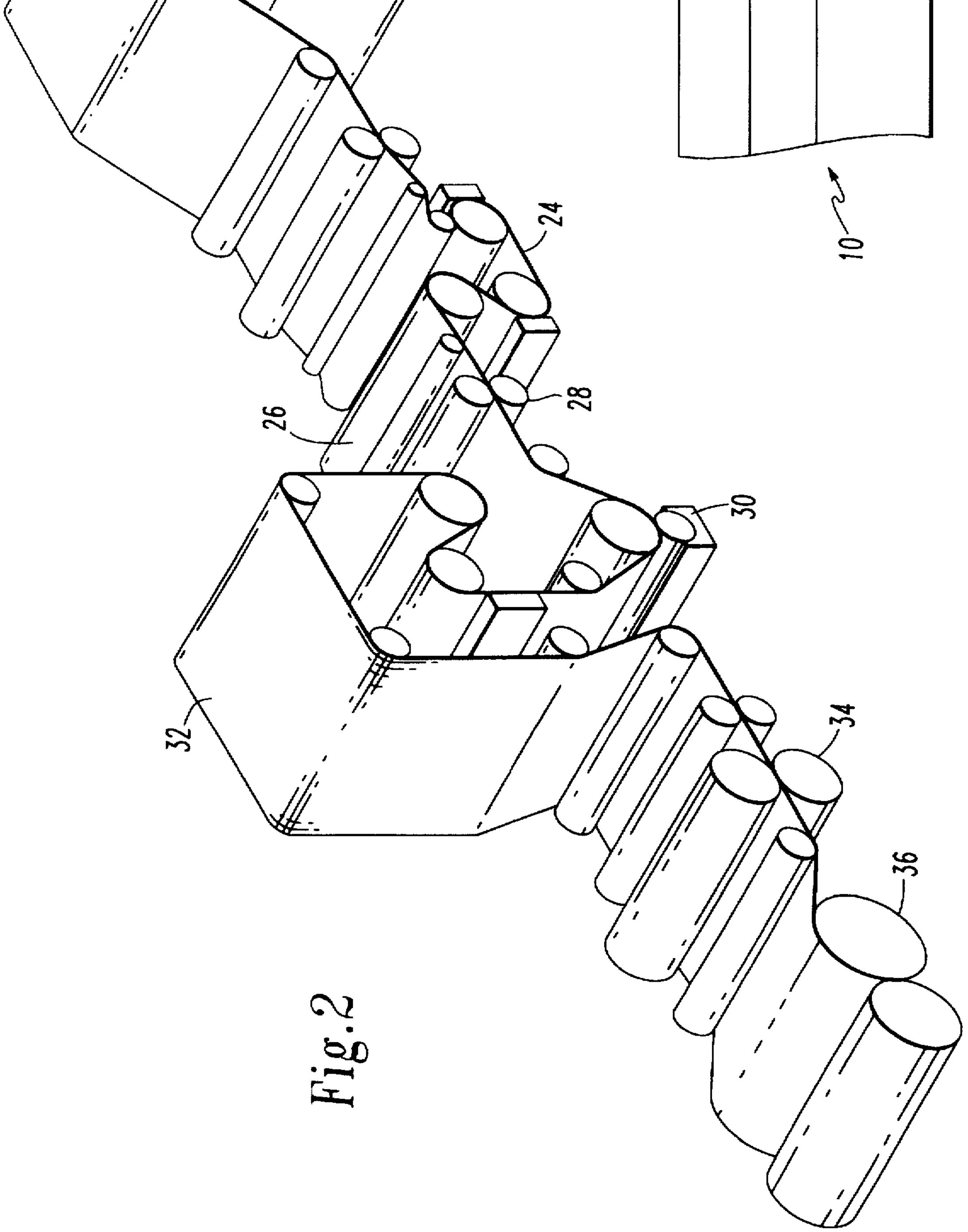

FIG. 2 illustrates one type of coating process that can be used to produce the improved coated plate stock of the present invention. It is contemplated that other arrangements familiar to those skilled in the paperboard coating art could also be employed for this purpose. The paperboard selected for use in forming the desired food container is preferably first sized at a size press (not shown). The amount of starch pick-up will depend on the desired strength of the final product. The sized paperboard 20 is fed to a top side coater 22, which may be a puddle coater, and then to a wire side coater 24, which may also be a puddle coater. The top side coater 22 is generally used to apply a backside coating to the board for some packaging grades. Water to assist with curl correction can also be applied with the coater 22. The base coat is applied by the coater 24. The base coat is dried by a combination of infrared dryers 26 and can dryers 28. The top coat may be applied by a long dwell coater 30, such as a modified Beloit S-matic coater. The coated paperboard is then dried in an infrared dryer 32, optionally calendered in a gloss calender 34, and then wound on a take-up reel 36, where it is stored until it is fed into forming dies to produce rigid coated paper plates, bowls, trays and other food containers. Coated paperboard produced as described can also be used to form carton blanks for food packaging and storage containers.

The properties of paperboard coated with various combinations of latexes and pigments were investigated. These included the varnish gloss, which is an indicator of the hold-out of the applied clay-latex coatings for press-applied overprint varnish. The "plate-coating" which is applied to the printed board is usually based on a solvent-based nitrocellulose varnish or a water-based styrene-acrylic varnish. The Varnish Gloss test involves applying a standard metered amount of varnish to the coated paperboard, drying the varnish in an oven, and reading the 20° gloss values of the varnished areas. The higher the number, the better the varnish hold-out and the better the grease and oil hold-out properties.

Other properties evaluated included coating continuity, plate grease resistance, gloss and Parker Print-Surf, which is a method of measuring the roughness of paper and paperboard based on the user instructions for the Messner Parker Print-Surf 90 Tester, supplied by Huygen Corporation of Wauconda, Ill. The lower the Parker Print-Surf value is, the smoother the surface of the paper. A smooth surface paper has a better print definition. The smoothness of the coated paperboard could also be determined by the Sheffield method described in TAPPI Publication T 538 om-88. Coated plates were prepared from paperboard for comparative testing. Two pigmented latex coatings were applied by coaters to base stock. A design was optionally printed on the coated surface, using conventional printing techniques, such as water or solvent based gravure. Two plate coatings, such as a nitrocellulose or styrene-acrylic polymer based coating, were applied to the coated side of the board using a Faustel press and then dried. Plates were subsequently formed on a web fed Peerless plate press.

The Cut Resistance test is used to evaluate the resistance of the coated paperboard to cutting by a table knife. After a number of strokes of a weighted knife against the coated paperboard, the board is tested with a stain to highlight any failure of the coating. The test rating is generated from the coating failures. The Grease Resistance test involves pouring heated oil containing a red dye into the coated paperboard test article. The test article is removed after 20 minutes, and the percentage failure is calculated from the back side of the article using a standard grid. The Coating Continuity is a measure of the uniformity of coating coverage on an article formed from the coated paperboard. A solution of a green dye stain is poured into the article, and excess stain is washed off with water. The degree of staining is rated by comparison with standards. The following Tables and Examples compare currently available food container paperboard coatings with those formulated according to the present invention applied to plates as described above. TABLE 1 presents varnish gloss and Parker Print data for single layer coatings consisting of a specified latex and a specified pigment. In TABLE 1, S504 refers to the BASF acrylate-styrene-acrylonitrile polymer known as ACRONAL® S504 described above. ECC refers to the pigment blend known as KAOCARB 5, also described above. Huber refers to a kaolin clay available as HYDRASPERSE. DP 5029 refers to a pigment blend of kaolin and calcium carbonate developed by Huber. DOW XU30879.50, 30978.51, and 30978.52 are styrene-acrylic latexes available from Dow Chemical Company. AIRFLEX 100HS is an ethylene vinyl acetate polymer. AIRVOL 107 is a polyvinyl alcohol, and AIRFLEX 4514 is an ethylene-vinyl chloride polymer. All of these polymers are available from Air Products Company. The coatings formed from the preferred acrylate-styrene-acrylonitrile polymer with a 90/10 or 80/20 blend of kaolin to calcium carbonate clearly demonstrate higher gloss varnish and lower Parker Print values. The DOW XU 30978.51 and KAOCARB 5 coating composition presented similar values for gloss varnish and Parker Print.

TABLE 1

| Latex/Pigment | Varnish Gloss | Parker Print |
|---|---|---|
| S504w/ECC 90/10 | 77.1 | 0.95 |
| S504w/ECC 80/20 .9.2# | 73.2 | 1.47 |
| S504w/ECC 7030 10.1# | 69.7 | 1.55 |
| S504 Huber 90/10 DP 5029 | 72.2 | 1.03 |
| S054/Huber (#1 Hydrafine + Grnd Carbonate) | 72.2 | 1.08 |
| Dow XU 30879.50/ECC | 51.0 | 2.93 |
| Dow XU 30978.51/ECC | 73.0 | 1.22 |
| Dow XU 30978.52/ECC | 53.4 | 1.75 |
| Airflex 100HS/Airvol 107 | 69.0 | 1.61 |
| Airflex 100HS/Airflex 4514 | 58.7 | 1.08 |
| Airflex 100HS | 32.8 | 2.0 |

In TABLE 2 and TABLE 3, the same designations used in TABLE 1 are used. In addition, GENCORP 5124M refers to a styrene-butadiene copolymer. Rohm & Haas Res 3103 refers to a polyvinylacetate-acrylic copolymer, and National Resyn 1119 refers to a polyvinyl acetate. The coating continuity is indicated as a value from 1 to 4, with the following definitions:

1—None
2—Slight

3—Moderate
4—Great

TABLE 2

| Latex/Pigment | Varnish Gloss | Coating Continuity | Plate Grease Resistance % FAIL | Gloss 75° MD | Gloss 75° CD |
|---|---|---|---|---|---|
| Acronal S504/ Huber clay | 66.3 | 2 | 0 | 74.8 | 59.5 |
| Dow XU-30879.5 | 51.0 | 2 | 1 | 69.6 | 52.0 |
| Dow XU-30978.51 | 73.0 | 2 | 1 | 64.3 | 52.9 |
| Gencorp 5124M | 65.0 | 3 | 68 | 64.8 | 53.1 |

The data in Table 2 demonstrates that the coating composition consisting of the ACRONAL® S 504 acrylate-styrene-acrylonitrile polymer and the Huber clay presents superior plate properties.

TABLE 3

| Latex/Pigment | Varnish Gloss | Coating Continuity Cork | Coating Continuity Reichhold | Plate Grease Resistance Cork % FAIL | Plate Grease Resistance Reichhold % FAIL |
|---|---|---|---|---|---|
| BASF Acronal S504/ ECCI clay | 87.4 | 1 | 1 | 6 | 4 |
| Rohm & Haas Res 3103/ECCI | 77.6 | 2 | 3 | 23 | 18 |
| Air Products Airflex 100 HS/Airvol 107 | 82.1 | 1 | 2 | 100 | 100 |
| National Resyn 1119/ECC | 79.4 | 2 | 3 | 100 | 100 |

The data in TABLE 3 shows that none of the latex-pigment compositions tested comes close to demonstrating the superior plate properties of the preferred acrylate-styrene-acrylonitrile latex and kaolin-calcium carbonate pigment blend.

TABLE 4 presents comparative data with respect to varnish gloss, coating split, and Parker Print for a clay paperboard coating based on ethylene vinyl acetate (EVA) and the preferred ACRONAL® S 504 polymer.

TABLE 4

| Latex | Varnish Gloss | Coating Split | Parker Print |
|---|---|---|---|
| Ethylene vinyl acetate | 18 | 77 | 1.95 |
| Acronal S504 | 60 | 160 | 1.50 |

In TABLE 4, as above, the varnish gloss is an indicator of the hold-out of the applied clay/latex coatings for press-applied overprint varnish. The higher the number, the better the varnish hold-out and the better the grease and oil hold-out properties. The results in TABLE 4 refer to paperboard that was not gloss calendered. The coating split gives an indication of the strength of the coating: the stronger the coating, as demonstrated by the higher numbers, the less likelihood the need for frequent wash-ups on the printing press. Low Parker Print values indicate better smoothness. The significantly lower Parker Print value of the preferred latex indicates improved print quality, particularly for the rotogravure printing typically used for plate stock.

EXAMPLES 1 and 2 describe two exemplary coating formulations according to the present invention. In the Example 1 coating formulation, the base coat and the top coat have different compositions, while in the Example 2 coating formulation, both the base coat and the top coat have the same formulation. The latex is not specified in the Example 2 coating formulation. A suitable latex may be selected from among those described above by one skilled in the paperboard coating art.

| | | |
|---|---|---|
| EXAMPLE 1 | | |
| | Base Coat | |
| Pigment: | Huber Hydrasperse (kaolin clay) | 80 parts |
| | ECCI Carbital 35 | 20 parts |
| Latex: | BASF ACRONAL S504 | 20 parts |
| Dispersant: | Dispex N40 | 0.12 parts |
| | Top Coat | |
| Pigment: | ECCI KAOCARB | 100 parts |
| Latex: | BASF ACRONAL S504 | 19 parts |
| Dispersant: | Dispex N40 | 0.05 parts |
| EXAMPLE 2 | | |
| | Base Coat | |
| Pigment: | ECCI KAOCARB 5 | 100 parts |
| Latex: | Latex: | 20 parts |
| Dispersant: | Dispex N40 | 0.1 parts |
| | Top Coat | |
| Pigment: | ECCI KAOCARB 5 | 100 parts |
| Latex: | Latex | 20 parts |
| Dispersant: | Dispex N40 | 0.1 parts |

INDUSTRIAL APPLICABILITY

The improved plate stock and coated paperboard and process for producing an improved plate stock and coated paperboard described herein are particularly useful for producing plates, bowls, trays and other food containers where it is desired to provide consumer food service products and food containers with improved grease, oil and cut resistance and improved smoothness, printing, and varnish gloss.

I claim:

1. A coated paperboard with a smooth, print-receptive finish suitable for forming disposable food service and food storage containers that are grease-resistant, oil soak-through resistant, and cut-resistant after the coated paperboard is subjected to the heat and pressure required to form the finished food containers, wherein a sized paperboard substrate with a basis weight suitable for forming a food service container or food storage container is coated with two layers of a coating composition consisting of:

(a) a base coat coating layer immediately adjacent to and covering a sized surface of the paperboard substrate, said base coat coating layer comprising a mixture of a polymer latex and a particulate pigment comprising a blend of a premium grade kaolin clay and an ultrafine, wet ground calcium carbonate, said polymer latex and said pigment being approved for food contact by the U.S. Food and Drug Administration; and (b) a top coat coating layer immediately adjacent to and covering the base coat coating layer, said top coat coating layer comprising a mixture of a styrene acrylic polymer latex and a particulate pigment comprising a blend of a premium grade kaolin clay and an ultrafine wet ground calcium carbonate, said styrene acrylic polymer latex and said pigment being approved for food contact by the U.S. Food and Drug Administration.

2. The coated paperboard described in claim 1, wherein the base coat coating layer polymer latex and pigment mixture has substantially the same composition as the composition of the top coat coating layer styrene acrylic polymer latex and pigment mixture.

3. The coated paperboard described in claim 2, wherein said base coat coating layer polymer latex approved for food contact is a styrene acrylic polymer.

4. The coated paperboard described in claim 1, wherein the base coat coating layer polymer latex and pigment mixture has a composition different from the composition of the polymer latex and pigment mixture of the top coat coating layer.

5. The coated paperboard described in claim 3, wherein the polymer latex in both the base coat coating layer and the top coat coating layer is an acrylate-styrene-acrylonitrile polymer approved for food contact.

6. The coated paperboard described in claim 3, wherein the polymer latex of said base coat and said top coat further includes at least one polymer approved for food contact by the U.S. Food and Drug Administration selected from the group consisting of ethylene vinyl acetates, ethylene vinyl chlorides, polyvinyl acetates, polyvinyl acetate-acrylate copolymers, polyvinyl alcohol, starch-latex grafts, styrene maleic anhydride polymers and styrene butadiene polymers.

7. The coated paperboard described in claim 3, wherein said base coat coating layer pigment is a blend of about 80 parts of a premium grade kaolin clay and about 20 parts calcium carbonate, and said top coat coating layer pigment is a blend of about 90 parts of a premium grade kaolin clay and about 10 parts calcium carbonate.

8. The coated paperboard described in claim 5, wherein both said base coat polymer and said top coat polymer is a n-alkyl acrylate-styrene-acrylonitrile polymer approved for food contact wherein the alkyl is ethyl, propyl, butyl, amyl, hexyl or octyl or an iso-alkyl-acrylate-styrene-acrylonitrile polymer approved for food contact wherein the alkyl is propyl, butyl, amyl, hexyl or octyl.

9. The coated paperboard described in claim 8, wherein said base coat polymer and said top coat polymer is n-butyl-acrylate-acrylonitrile-styrene.

10. The coated paperboard described in claim 1, wherein said styrene acrylic polymer has a glass transition temperature of about −6° C. to about +31° C.

11. The coated paperboard described in claim 1, wherein said sized paperboard substrate layer has a basis weight in the range of about 90 pounds per 3000 square feet to about 300 pounds per 3000 square feet.

12. The coated paperboard described in claim 1, wherein said sized paperboard substrate layer has a basis weight of 90 to 300 pounds per 3000 square feet, the base coat coating layer and top coat coating layer polymer latex comprises an acrylate-styrene-acrylonitrile polymer approved for food contact with a glass transition temperature of −6° to +31° C., the base coat coating layer pigment comprises a blend of 80 parts of a premium grade kaolin clay and 20 parts of an ultrafine, wet ground calcium carbonate, and the top coat coating layer pigment comprises a blend of 90 parts of a premium grade kaolin clay and 10 parts of an ultrafine, wet ground calcium carbonate.

13. A process for producing a coated paperboard with a smooth, print-receptive surface suitable for forming disposable food service containers and food storage containers from the coated paperboard that are grease, oil soak-through and cut resistant after the coated paperboard is subjected to the heat and pressure required to form the finished food containers, wherein said process includes the steps of:

(a) obtaining a sized paperboard with a basis weight suitable for forming a food service container or a food storage container;

(b) forming a base coat comprising a mixture of a polymer latex and a particulate pigment approved for food contact by the U.S. Food and Drug Administration comprising a blend of a premium grade kaolin clay and an ultrafine, wet ground calcium carbonate and applying said base coat directly adjacent to the sized surface of the paperboard; and (c) forming a separate top coat comprising a mixture of a styrene acrylic polymer latex and a particulate pigment approved for food contact by the U.S. Food and Drug Administration comprising a blend of a premium grade kaolin clay and an ultrafine, wet ground calcium carbonate and applying said separate top coat directly over the base coat to produce a coated paperboard with a smooth print-receptive finish that is grease, oil soak-through and cut resistant after the coated paperboard is processed to form finished food containers.

14. The process described in claim 13, wherein the base coat polymer latex and pigment mixture has substantially the same composition as the composition of the top coat styrene acrylic polymer latex and pigment mixture.

15. The process described in claim 13, wherein said base coat polymer latex is a styrene acrylic polymer approved for food contact.

16. The process described in claim 14, wherein said base coat polymer approved for food contact and said top coat polymer approved for food contact is a n-alkyl acrylate-styrene-acrylonitrile polymer wherein the alkyl is ethyl, propyl, butyl, amyl, hexyl or octyl or an iso-alkyl-acrylate-styrene-acrylonitrile polymer wherein the alkyl is propyl, butyl, amyl, hexyl or octyl.

17. The process described in claim 13, wherein the base coat polymer latex and pigment mixture has a composition different from the composition of the polymer latex and pigment mixture of the top coat.

18. The process described in claim 15, wherein the polymer latex in both the base coat and the top coat is an acrylate-styrene-acrylonitrile polymer approved for food contact.

19. The process described in claim 13, wherein the mixture of polymer latex and pigment of each of said base coat and said top coat further includes at least one polymer selected from the group consisting of ethylene vinyl acetates, ethylene vinyl chlorides, polyvinyl acetates, polyvinyl acetate-acrylate copolymers, polyvinyl alcohol, starch-latex grafts, styrene maleic anhydride polymers and styrene butadiene polymers.

20. The process described in claim 13, wherein said base coat pigment is a blend of about 80 parts of said kaolin clay and about 20 parts of said calcium carbonate, and said top coat pigment is a blend of about 90 parts of said kaolin clay and about 10 parts of said calcium carbonate.

21. The process described in claim 20, wherein said base coat polymer approved for food contact and said top coat polymer approved for food contact is n-butyl-acrylate-acrylonitrile-styrene.

22. A coated paperboard produced according to the process described in claim 13.

23. The process described in claim 13, further including the steps of applying a further coating over the top coat of the coated paperboard and forming a finished food service container or a food storage container that is grease, oil soak-through and cut-resistant from the coated paperboard.

24. The process described in claim 23, further including the step of printing desired designs or indicia on the coated paperboard before said further coating is applied.

25. A food service container produced according to the process described in claim 23.

26. The process described in claim 13, wherein the base coat is applied to the sized paperboard at a coat weight of 8 pounds per 3000 square feet and the top coat is applied to the base coat at a coat weight of 6 pounds per 3000 square feet.

27. A substantially rigid food service container that is grease-resistant, oil soak-through resistant and cut resistant formed from a coated paperboard comprising a sized paperboard substrate having a basis weight of 90 to 300 pounds per 3000 square feet; a base coat covering a food-contacting, sized surface of the sized paperboard substrate comprising a mixture of a polymer and pigment approved for food contact by the U.S. Food and Drug Administration; a top coat covering the base coat comprising a mixture of a polymer and a pigment approved for food contact by the U.S. Food and Drug Administration; and a further finish coating covering the top coat, wherein the polymer of both said base and top coats comprises an acrylate-styrene-acrylonitrile polymer with a glass transition temperature of −6° to +31° C. approved for food contact, the pigment of said base coat comprises a blend of 80 parts of a premium grade kaolin clay and 20 parts of an ultrafine, wet ground calcium carbonate, and the pigment of said top coat comprises a blend of 90 parts of a premium grade kaolin clay and 10 parts of an ultrafine, wet ground calcium carbonate, and wherein said kaolin clay has a % GE brightness in excess of 85% and 80% of particles less than 2 microns in size.

28. A coated paperboard with a smooth, print-receptive finish suitable for forming disposable food service and food storage containers that are grease-resistant, oil soak-through resistant, and cut-resistant after the coated paperboard is subjected to the heat and pressure required to form the finished food containers, wherein a sized paperboard substrate with a basis weight suitable for forming a food service container or food storage container is coated with two layers of a coating composition consisting of:

(a) a base coat coating layer immediately adjacent to and covering a sized surface of the paperboard substrate, said base coat coating layer comprising a mixture of a polymer with a glass transition temperature of −6° to +31° C. and at least one particulate pigment selected from the group consisting of calcined clay, chemically structured clay, ground calcium carbonate, precipitated calcium carbonate, talc, titanium dioxide, silica, alumina, barytes, calcium sulfate, aluminosilicates, plastic pigments, hollow sphere plastic pigments and hollow glass pigments, said polymer and said pigment being approved for food contact by the U.S. Food and Drug Administration; and (b) a top coat coating layer immediately adjacent to and covering the base coat coating layer, said top coat coating layer comprising a mixture of a styrene acrylic polymer with a glass transition temperature of −6° to +31° C. and at least one particulate pigment selected from the group consisting of calcined clay, chemically structured clay, ground calcium carbonate, precipitated calcium carbonate, talc, titanium dioxide, silica, alumina, barytes, calcium sulfate, aluminosilicates, plastic pigments, hollow sphere plastic pigments and hollow glass pigments, said styrene acrylic polymer and said pigment being approved for food contact by the U.S. Food and Drug Administration.

29. A process for producing a coated paperboard with a smooth, print-receptive surface suitable for forming disposable food service containers and food storage containers from the coated paperboard that are grease, oil soak-through and cut resistant after the coated paperboard is subjected to the heat and pressure required to form the finished food containers, wherein said process includes the steps of:

(a) obtaining a sized paperboard with a basis weight suitable for forming a food service container or a food storage container;

(b) forming a base coat comprising a mixture of a polymer having a glass transition temperature of –6° to +31° C. and at least one particulate pigment approved for food contact by the U.S. Food and Drug Administration selected from the group consisting of calcined clay, chemically structured clay, ground calcium carbonate, precipitated calcium carbonate, talc, titanium dioxide, silica, alumina, barytes, calcium sulfate, aluminosilicates, plastic pigments, hollow sphere plastic pigments and hollow glass pigments, and applying said base coat directly adjacent to the sized surface of the paperboard; and (c) forming a separate top coat comprising a mixture of a styrene acrylic polymer having a glass transition temperature of –6° to +31° C. and at least one particulate pigment approved for food contact by the U.S. Food and Drug Administration selected from the group consisting of calcined clay, chemically structured clay, ground calcium carbonate, precipitated calcium carbonate, talc, titanium dioxide, silica, alumina, barytes, calcium sulfate, aluminosilicates, plastic pigments, hollow sphere plastic pigments and hollow glass pigments, and applying said separate top coat directly over the base coat to produce a coated paperboard with a smooth print-receptive finish that is grease, oil soak-through and cut resistant after the coated paperboard is processed to form finished food containers.

* * * * *